(12) United States Patent
Shoeb

(10) Patent No.: US 12,399,508 B2
(45) Date of Patent: Aug. 26, 2025

(54) AUTOMATIC SELECTION OF DELIVERY ZONES USING SURVEY FLIGHT 3D SCENE RECONSTRUCTIONS

(71) Applicant: Wing Aviation LLC, Mountain View, CA (US)

(72) Inventor: Ali Shoeb, San Rafael, CA (US)

(73) Assignee: Wing Aviation LLC, Palo Alto, CA (US)

( * ) Notice: Subject to any disclaimer, the term of this patent is extended or adjusted under 35 U.S.C. 154(b) by 197 days.

(21) Appl. No.: 18/056,710

(22) Filed: Nov. 17, 2022

(65) Prior Publication Data

US 2024/0168493 A1    May 23, 2024

(51) Int. Cl.

| | |
|---|---|
| G05D 1/00 | (2024.01) |
| B64C 39/02 | (2023.01) |
| B64D 47/08 | (2006.01) |
| B64U 10/00 | (2023.01) |
| B64U 101/64 | (2023.01) |

(52) U.S. Cl.
CPC ............. G05D 1/12 (2013.01); B64C 39/024 (2013.01); B64D 47/08 (2013.01); B64U 10/00 (2023.01); G05D 1/101 (2013.01); *B64U 2101/64* (2023.01); *B64U 2201/10* (2023.01)

(58) Field of Classification Search
CPC .......... G05D 1/12; G05D 1/101; B64U 10/00; B64C 39/024; B64D 47/08
See application file for complete search history.

(56) References Cited

U.S. PATENT DOCUMENTS

| | | | |
|---|---|---|---|
| 10,056,001 B1* | 8/2018 | Harris | G06V 20/17 |
| 10,353,388 B2 | 7/2019 | Schubert et al. | |
| 10,545,500 B2 | 1/2020 | Schubert et al. | |
| 11,410,552 B2 | 8/2022 | Toma et al. | |
| 2017/0069214 A1* | 3/2017 | Dupray | G08G 5/0008 |
| 2017/0124883 A1* | 5/2017 | Modica | G05D 1/0676 |

(Continued)

FOREIGN PATENT DOCUMENTS

KR    20170111921 A    10/2017

*Primary Examiner* — Jelani A Smith
*Assistant Examiner* — Toya Pettiegrew
(74) *Attorney, Agent, or Firm* — McDonnell Boehnen Hulbert & Berghoff LLP

(57) ABSTRACT

A method includes navigating, by an uncrewed aerial vehicle (UAV), to a delivery location in an environment. The method also includes capturing, by at least one sensor on the UAV, sensor data representative of the delivery location. The method further includes determining, based on the sensor data representative of the delivery location, a segmented point cloud. The segmented point cloud defines a point cloud of the delivery location segmented into a plurality of point cloud areas with corresponding semantic classifications. The method additionally includes determining, based on the segmented point cloud, at least one delivery point in the delivery location. The at least one delivery point in the delivery location satisfies at least one condition indicating that a descent path above the at least one delivery point represented in the point cloud is at least a particular lateral distance away from point cloud areas with corresponding semantic classifications indicative of an obstacle at the delivery location. The method also includes transmitting, by the UAV, the at least one delivery point to a server device.

22 Claims, 12 Drawing Sheets

(56) References Cited

U.S. PATENT DOCUMENTS

| | | | |
|---|---|---|---|
| 2017/0369167 A1* | 12/2017 | Meadow | B64U 10/10 |
| 2018/0107211 A1* | 4/2018 | Schubert | G01C 21/005 |
| 2018/0204469 A1* | 7/2018 | Moster | B64U 10/13 |
| 2019/0248487 A1 | 8/2019 | Holtz | |
| 2020/0207474 A1 | 7/2020 | Foggia et al. | |
| 2020/0258400 A1 | 8/2020 | Yuan et al. | |
| 2020/0326729 A1 | 10/2020 | Ham et al. | |
| 2022/0055746 A1 | 2/2022 | Zhang | |
| 2023/0142394 A1* | 5/2023 | Henry | G05D 1/65 382/103 |
| 2024/0019589 A1* | 1/2024 | Jenkins | G01S 19/40 |

\* cited by examiner

AUTOMATIC SELECTION OF DELIVERY ZONES USING SURVEY FLIGHT 3D SCENE RECONSTRUCTIONS

BACKGROUND

An uncrewed vehicle, which may also be referred to as an autonomous vehicle, is a vehicle capable of travel without a physically-present human operator. An uncrewed vehicle may operate in a remote-control mode, in an autonomous mode, or in a partially autonomous mode.

When an uncrewed vehicle operates in a remote-control mode, a pilot or driver that is at a remote location can control the uncrewed vehicle via commands that are sent to the uncrewed vehicle via a wireless link. When the uncrewed vehicle operates in autonomous mode, the uncrewed vehicle typically moves based on pre-programmed navigation waypoints, dynamic automation systems, or a combination of these. Further, some uncrewed vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of uncrewed vehicles exist for various different environments. For instance, uncrewed vehicles exist for operation in the air, on the ground, underwater, and in space. Examples include quad-copters and tail-sitter UAVs, among others. uncrewed vehicles also exist for hybrid operations in which multi-environment operation is possible. Examples of hybrid uncrewed vehicles include an amphibious craft that is capable of operation on land as well as on water or a floatplane that is capable of landing on water as well as on land. Other examples are also possible.

SUMMARY

Examples disclosed herein include methods for navigating a UAV to deliver a payload while avoiding collisions caused by delivering onto and/or in close proximity to various obstacles at a delivery location. A UAV may navigate to a delivery location and survey the delivery location to determine one or more delivery points at the delivery location that satisfy at least one condition indicating that a descent path above the respective delivery point is at least a particular lateral distance away from obstacles in the environment. The UAV may then transmit the delivery points to a server device for storage.

In a first aspect, a method includes navigating, by an uncrewed aerial vehicle (UAV), to a delivery location in an environment. The method also includes capturing, by at least one sensor on the UAV, sensor data representative of the delivery location. The method further includes determining, based on the sensor data representative of the delivery location, a segmented point cloud. The segmented point cloud defines a point cloud of the delivery location segmented into a plurality of point cloud areas with corresponding semantic classifications. The method additionally includes determining, based on the segmented point cloud, at least one delivery point in the delivery location. The at least one delivery point in the delivery location satisfies at least one condition indicating that a descent path above the at least one delivery point represented in the point cloud is at least a particular lateral distance away from point cloud areas with corresponding semantic classifications indicative of an obstacle at the delivery location. The method also includes transmitting, by the UAV, the at least one delivery point to a server device.

In a second aspect, an uncrewed aerial vehicle (UAV) comprises a sensor and a control system configured to navigate, by the UAV, to a delivery location in an environment. The control system is also configured to capture, by the at least one sensor on the UAV, sensor data of the delivery location. The control system is further configured to determine, based on the sensor data representative of the delivery location, a segmented point cloud. The segmented point cloud defines a point cloud of the delivery location segmented into a plurality of point cloud areas with corresponding semantic classifications. The control system is additionally configured to determine, based on the segmented point cloud, at least one delivery point in the delivery location. The at least one delivery point in the delivery location satisfies at least one condition indicating that a descent path above the at least one delivery point represented in the point cloud is at least a particular lateral distance away from point cloud areas with corresponding semantic classifications indicative of an obstacle at the delivery location. The control system is further configured to transmit, by the UAV, the at least one delivery point to a server device.

In a third aspect, a non-transitory computer-readable medium comprises program instructions executable by one or more processors to perform operations comprising navigating, by an uncrewed aerial vehicle (UAV), to a delivery location in an environment. The operations further comprise capturing, by at least one sensor on the UAV, sensor data representative of the delivery location. The operations also comprise determining, based on the sensor data of the delivery location, a segmented point cloud. The segmented point cloud defines a point cloud of the delivery location segmented into a plurality of point cloud areas with corresponding semantic classifications. The operations further comprise determining, based on the segmented point cloud, at least one delivery point in the delivery location. The at least one delivery point in the delivery location satisfies at least one condition indicating that a descent path above the at least one delivery point represented in the point cloud is at least a particular lateral distance away from point cloud areas with corresponding semantic classifications indicative of an obstacle at the delivery location. The operations additionally include transmitting, by the UAV, the at least one delivery point to a server device.

In a fourth aspect, a system includes means for navigating, by an uncrewed aerial vehicle (UAV), to a delivery location in an environment. The system also includes means for capturing, by a sensor on the UAV, sensor data of the delivery location. The system further includes means for determining, based on the sensor data of the delivery location, a segmented point cloud. The segmented point cloud defines a point cloud of the delivery location segmented into a plurality of point cloud areas with corresponding semantic classifications. The system additionally includes means for determining, based on the segmented point cloud, at least one delivery point in the delivery location. The at least one delivery point in the delivery location satisfies at least one condition indicating that a descent path above the at least one delivery point represented in the point cloud is at least a particular lateral distance away from point cloud areas with corresponding semantic classifications indicative of an obstacle at the delivery location. The system further includes means for transmitting, by the UAV, the at least one delivery point to a server device.

These, as well as other aspects, advantages, and alternatives, will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
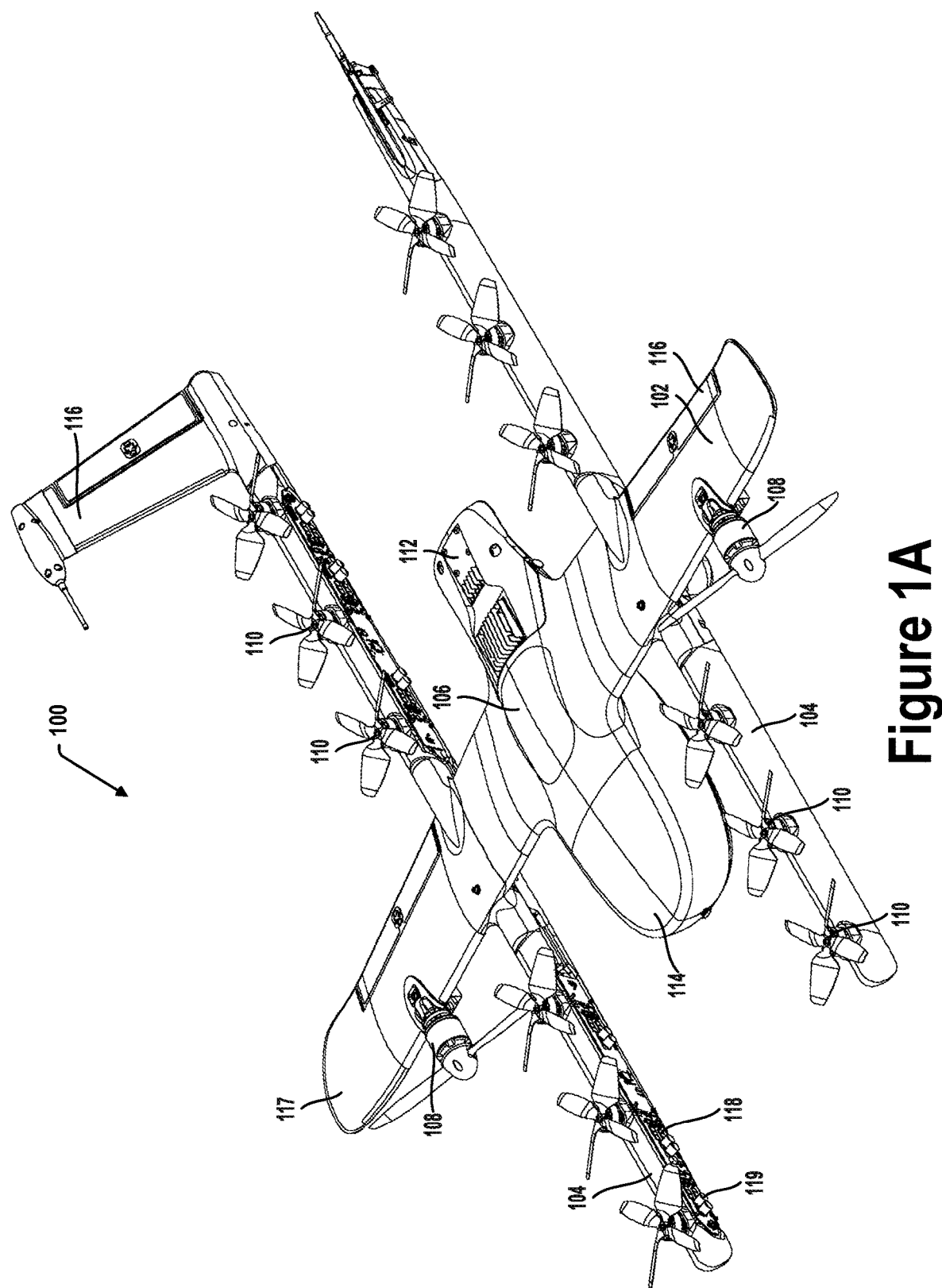
FIG. 1A is a simplified illustration of an uncrewed aerial vehicle, according to example embodiments, in accordance with example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

An example usage of UAVs may be to deliver various items to customers. For example, a UAV may be tasked with picking up a payload containing an item from a location and delivering the payload to a customer's residence, commercial building, or other location. One potential problem that might arise in this delivery process is determining an appropriate delivery point to safely deliver the payload. A delivery point positioned next to the customer's house or commercial building or otherwise located at an address could be obstructed by various obstacles, such as trees, roads, sidewalks, cars, among other examples. Delivering the payload while being in proximity to one of these obstacles could damage the UAV, the payload, the contents of the payload, and/or the obstacle.

Therefore, when the UAV is delivering the payload, it may be important to ensure that the payload is dropped off at a delivery point that does not disrupt activities in the surrounding area, e.g., that the payload is dropped off at a delivery point relatively free of obstacles. For example, the UAV could navigate to drop off a customer's package next to the customer's garage pathway rather than the sidewalk next to the customer's house if the customer's sidewalk is obstructed by a tree. As another example, the customer's home could be in a forest, and the UAV could determine to abort the delivery due to all the obstacles in the environment.

In some situations, delivering a payload may involve the UAV navigating to a delivery point and descending to a particular altitude before extending a payload. Processes for obstacle detection may involve identifying obstacles from two-dimensional images taken from a top-down view of the environment. However, from these images, an accurate descent path may be difficult to determine, as the top down images may not depict the full dimensionality of the objects in the environment.

Further complicating this process, the UAV may not have access to updated maps and/or satellite imagery to determine delivery points prior to having to execute a mission. Without access to accurate maps and/or satellite imagery, it may be difficult for the UAV to determine where in the environment to navigate in order to deliver the payload.

Provided herein are methods for surveying a delivery location for delivery points and determining delivery points using a three-dimensional segmented point cloud. A UAV may navigate to a delivery location and systematically survey the delivery location for delivery points that meet one or more conditions. The UAV may send these delivery points to a server device, which may store delivery points determined by one or more additional UAVs. When a UAV is tasked with a mission to deliver a payload to a delivery location, the UAV may transmit a request and receive a delivery point at the delivery location.

To survey the delivery location, the UAV may capture sensor data representative of the delivery location. The UAV may include a camera and/or a LIDAR sensor, which the UAV may use to capture one or more images and/or LIDAR data. The UAV may use this sensor data to determine a segmented point cloud, which may include point cloud areas with corresponding semantic classifications. For example, the segmented point cloud may have a point cloud area with a semantic classification indicating trees, a point cloud area with a semantic classification indicating a river, a point cloud area with a semantic classification indicating a yard, and/or a point cloud area with a semantic classification indicating a home, among other examples.

Based on the segmented point cloud, the UAV may determine one or more delivery points at the delivery location. The delivery points may be determined to satisfy various conditions, including, for example, a condition that indicates a descent path above the delivery point is at least a particular lateral distance away from point cloud areas with corresponding semantic classifications indicative of obstacles.

For example, the UAV may determine a segmentation point cloud including a point cloud area indicating a tree, a point cloud area indicating a building, and a point cloud area indicating a grass lawn. The UAV may determine a delivery point such that the delivery point is at least a particular lateral distance away from these obstacles and the delivery path extending above the delivery point is at least a particular lateral distance away from these obstacles at every point along the delivery path. In particular, the delivery point at the ground level may have a lateral distance that is farther from the trees than a delivery point at the level of the tree leaves, as the trunk of the tree may not extend as far as the branches and/or leaves of the tree. However, by determining a three dimensional segmented point cloud, the UAV may determine a delivery point that is at least a lateral distance away from obstacles at every point along a delivery path extending above the delivery point. Additional conditions may also be applied.

In some examples, semantic classifications indicative of an obstacle may also include semantic classifications corresponding to an unacceptable delivery surface and semantic classifications corresponding to an object exceeding a threshold height. For example, the semantic classifications may indicate a pool, a river, or another unacceptable delivery surface. Additionally and/or alternatively, the semantic classifications may indicate that the object is likely above reach and/or exceeds the threshold height, which may also be considered indicative of an obstacle. For example, semantic classifications indicating a building, a shed, and/or a house may correspond with the object likely exceeding the threshold height.

After determining one or more delivery points, the UAV may transmit the delivery points to a server device. The server device may store delivery points from various UAVs. When a particular UAV is tasked with a mission to deliver a payload to a delivery location, the UAV may query the server device for delivery points that correspond to the delivery location. In this manner, the UAV may focus on determining the path to the delivery point, rather than attempting to determine the delivery point itself. In some examples, upon arrival at the delivery point, the UAV may also verify the delivery point is still a valid delivery point to deliver payloads.

II. EXAMPLE UNCREWED VEHICLES

Herein, the terms "uncrewed aerial vehicle" and "UAV" refer to any autonomous or semi-autonomous vehicle that is capable of performing some functions without a physically present human pilot. As would be understood by one of skill in the art, uncrewed and unmanned may be used interchangeably.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "uncrewed aerial vehicle system" (UAVS), or "uncrewed aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
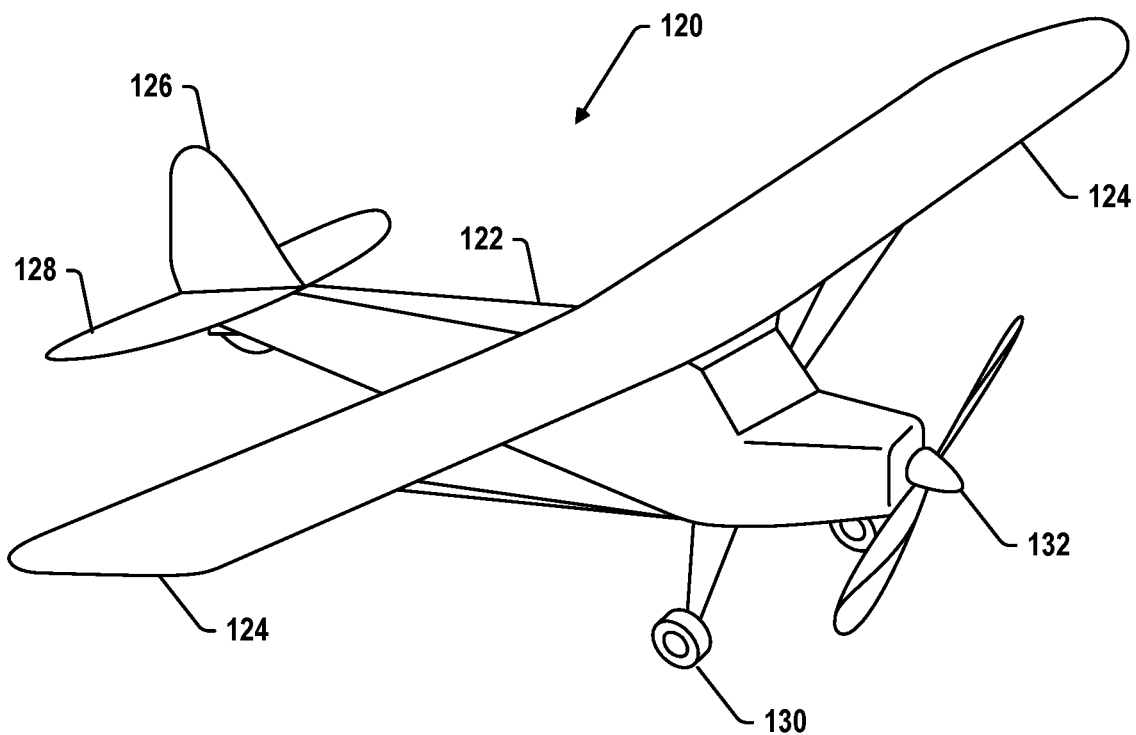
FIG. 1B is a simplified illustration of an uncrewed aerial vehicle, according to example embodiments, in accordance with example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
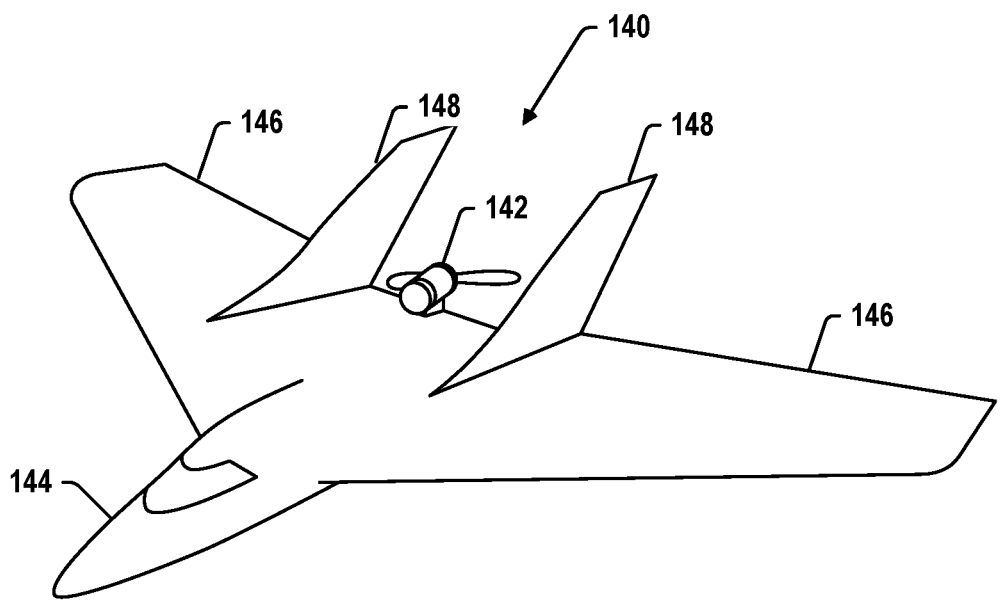
FIG. 1C is a simplified illustration of an uncrewed aerial vehicle, according to example embodiments, in accordance with example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
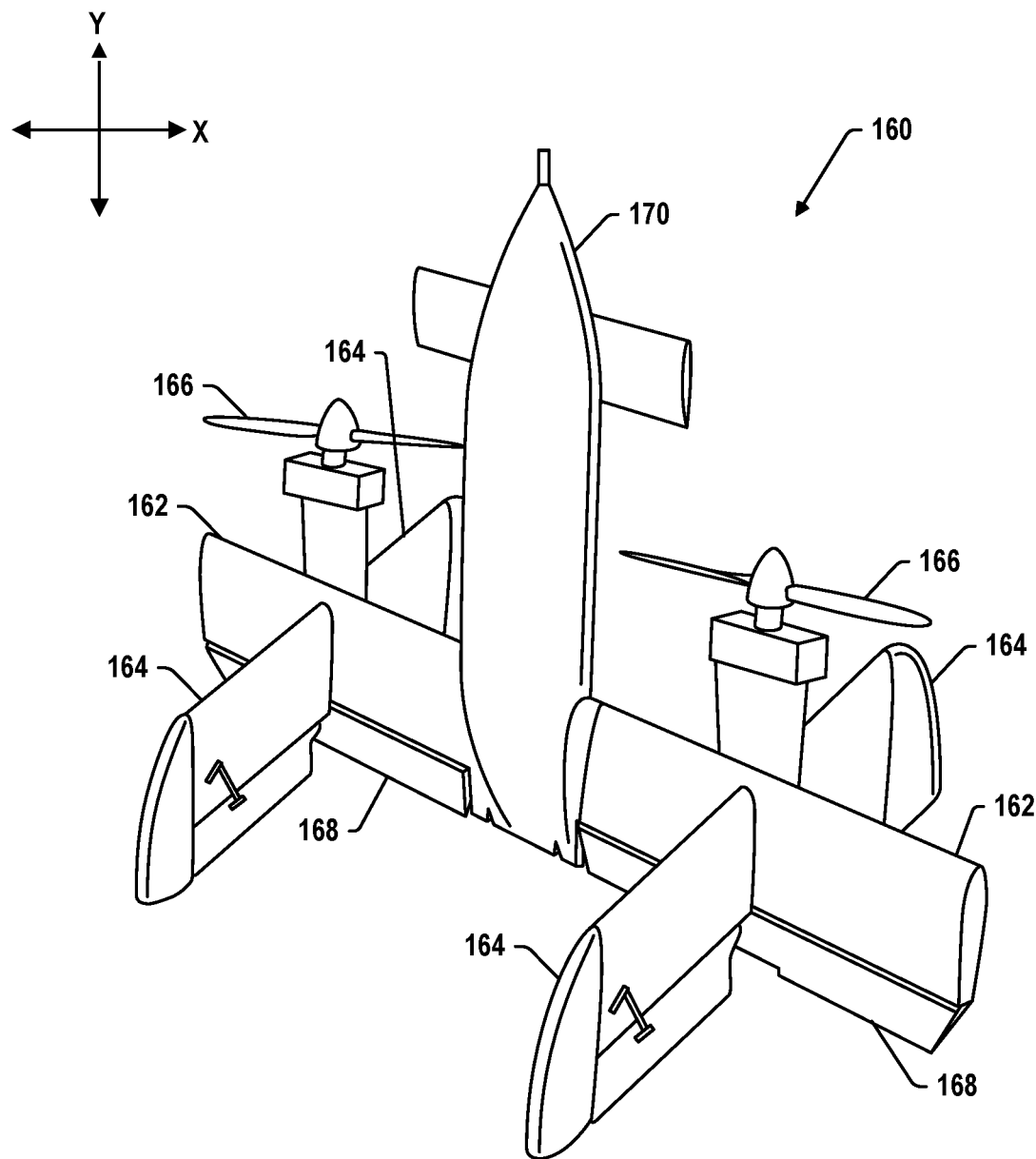
FIG. 1D is a simplified illustration of an uncrewed aerial vehicle, according to example embodiments, in accordance with example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
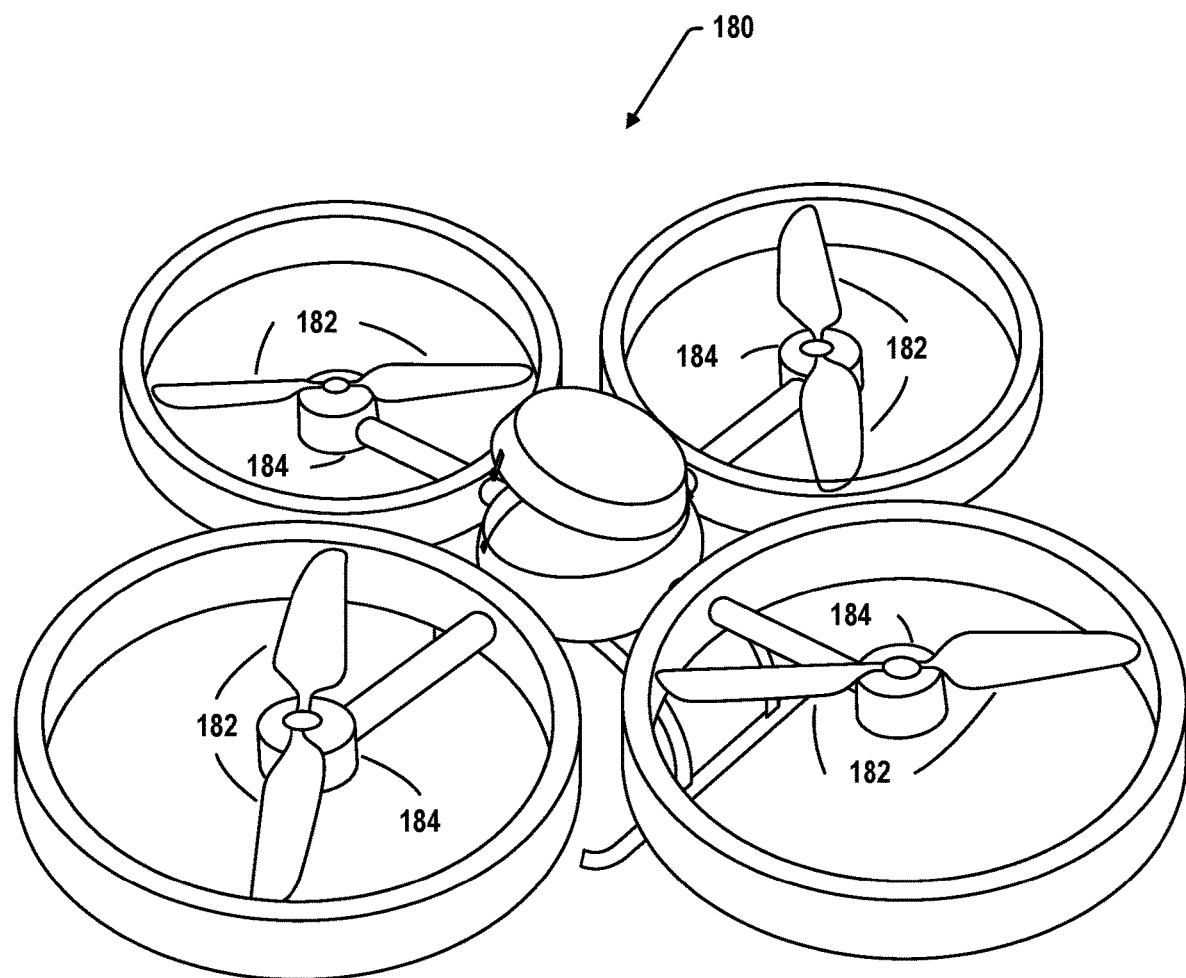
FIG. 1E is a simplified illustration of an uncrewed aerial vehicle, according to example embodiments, in accordance with example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

III. ILLUSTRATIVE UAV COMPONENTS

Figure 2:
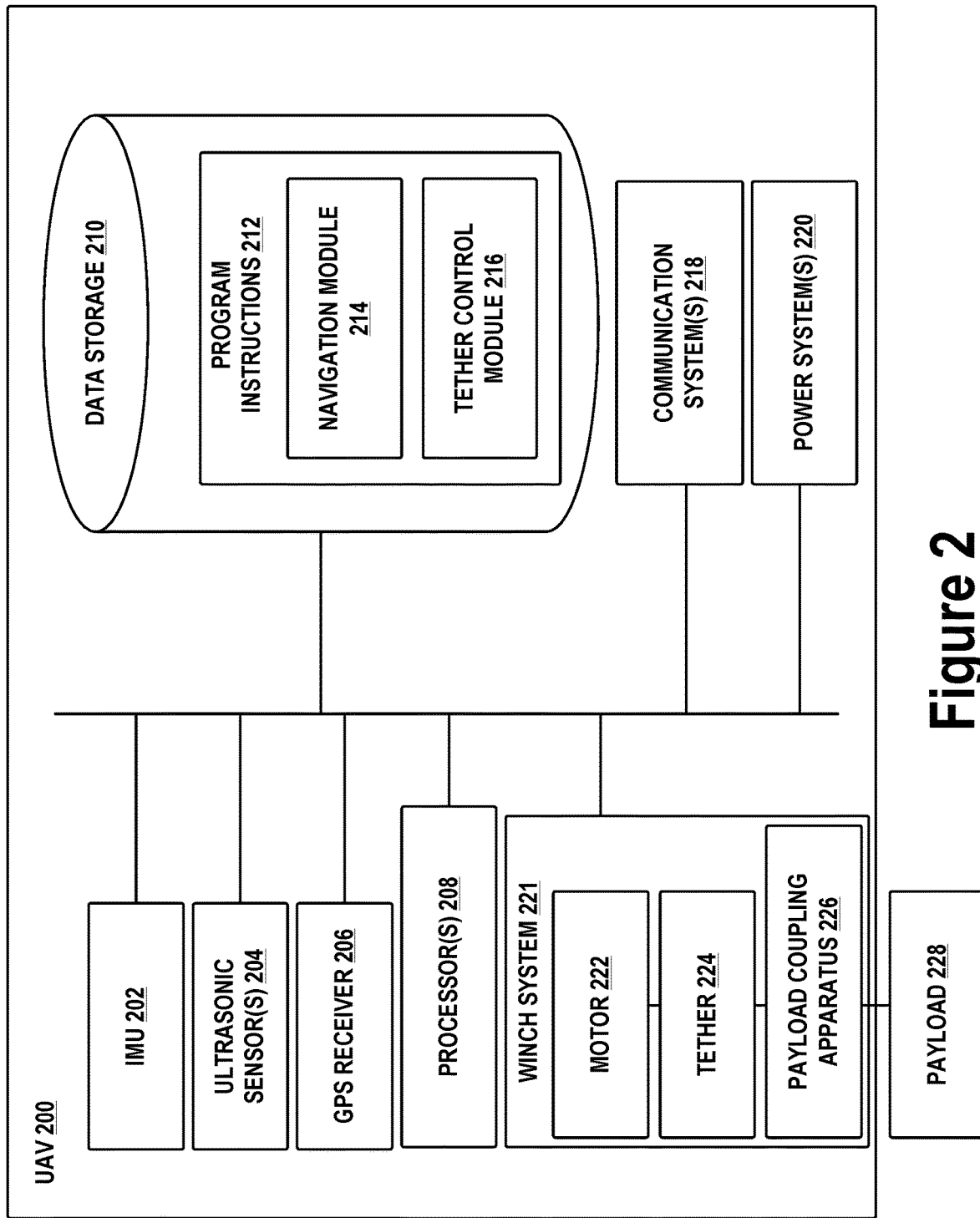
FIG. 2 is a simplified block diagram illustrating components of an uncrewed aerial vehicle, in accordance with example embodiments.

FIG. 2 is a simplified block diagram illustrating components of a UAV 200, according to an example embodiment.

UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

i. A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

i. B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

i. C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

i. D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

i. E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operation specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

Figure 3:
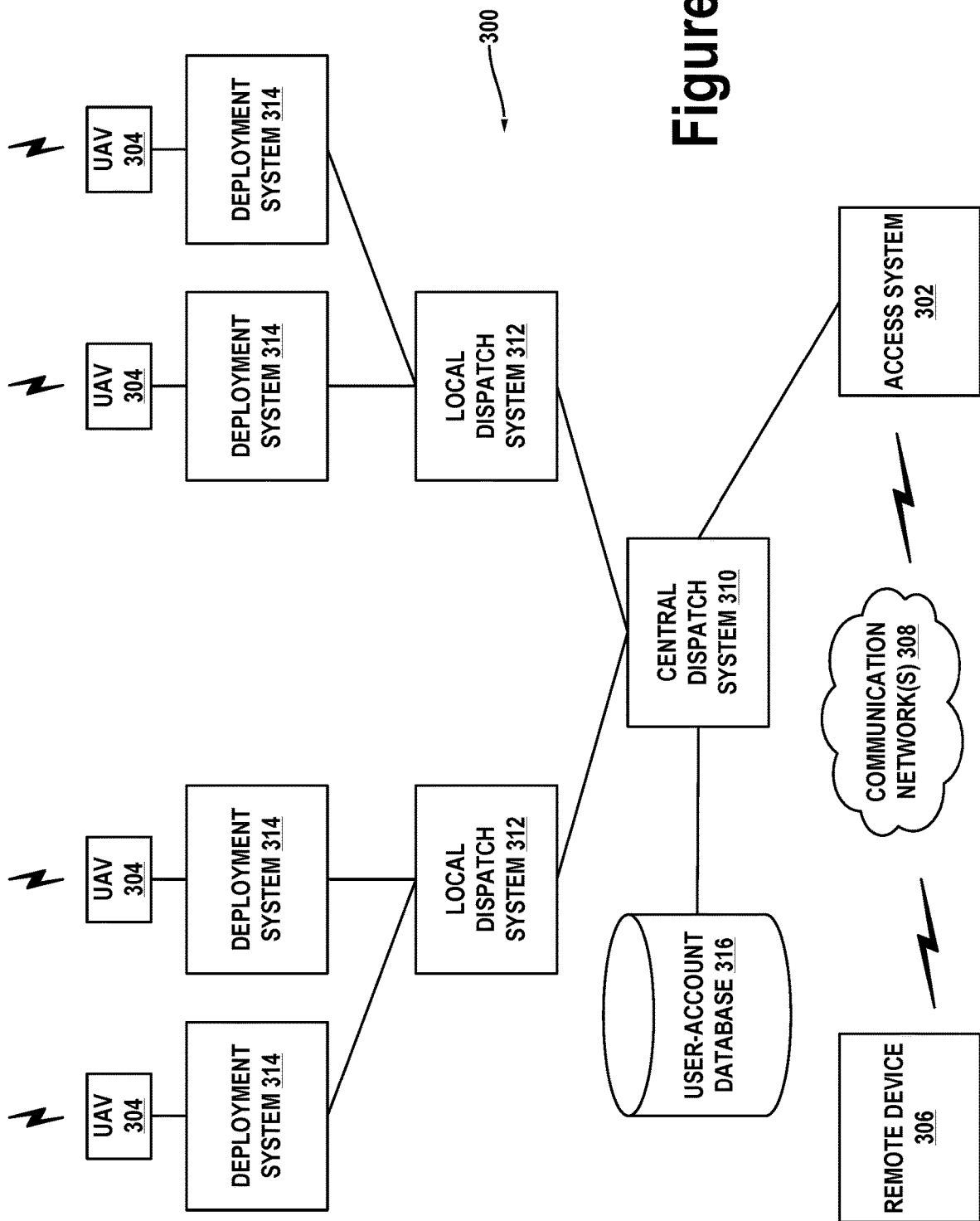
FIG. 3 is a simplified block diagram illustrating a UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. MACHINE LEARNING MODELS FOR GENERATING INFERENCES/PREDICTIONS

Figure 4:
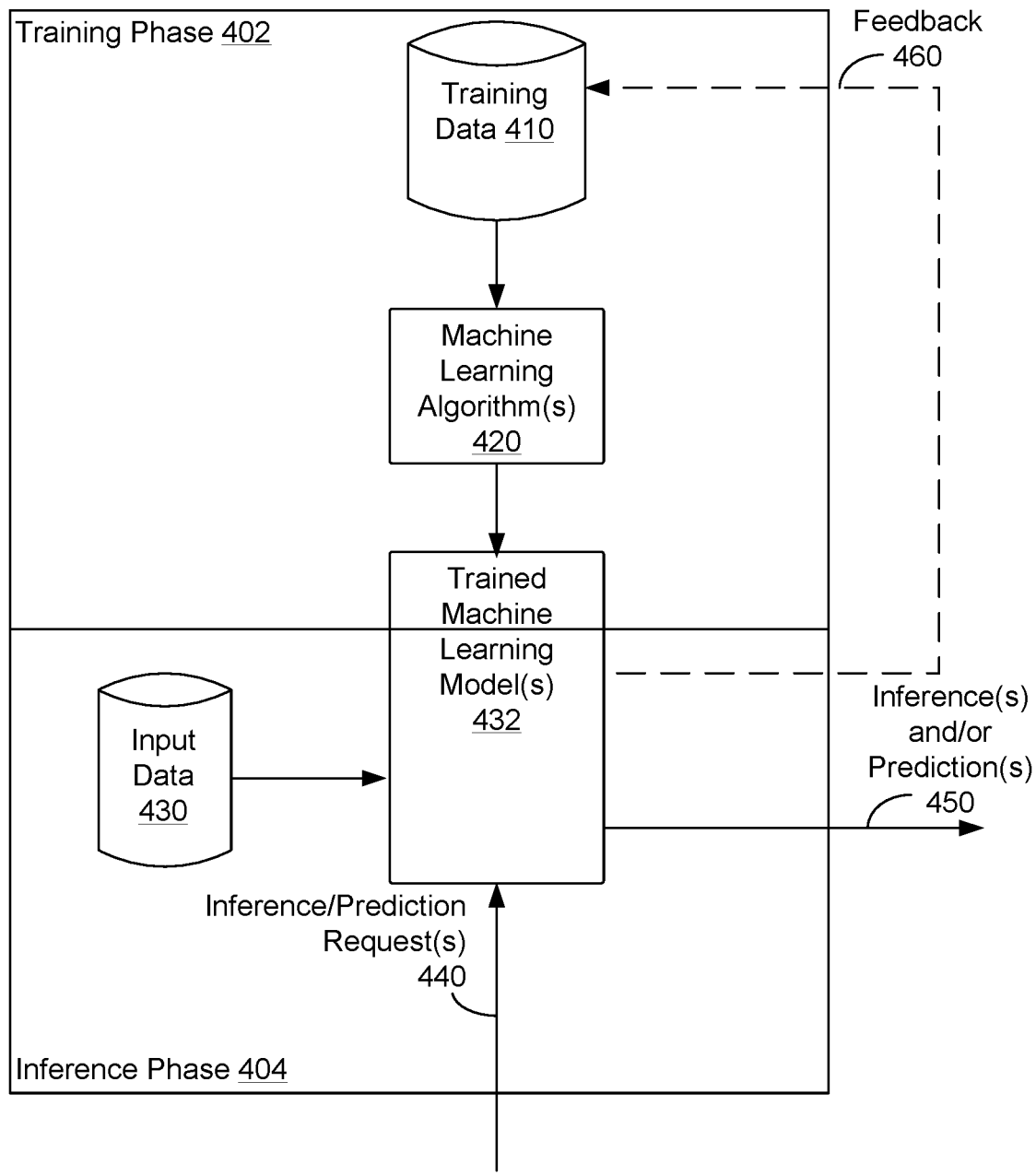
FIG. 4 is a diagram illustrating training and inference phases of a machine learning model, in accordance with example embodiments.

A UAV may be configured to use one or more machine learning models to facilitate perception, localization, navigation, and/or other UAV operations. FIG. 4 shows diagram 400 illustrating a training phase 402 and an inference phase 404 of trained machine learning model(s) 432, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 4 shows training phase 402 where one or more machine learning algorithms 420 are being trained on training data 410 to become trained machine learning model 432. Then, during inference phase 404, trained machine learning model 432 can receive input data 430 and one or more inference/prediction requests 440 (perhaps as part of input data 430) and responsively provide as an output one or more inferences and/or predictions 450.

As such, trained machine learning model(s) 432 can include one or more models of one or more machine learning algorithms 420. Machine learning algorithm(s) 420 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 420 may be supervised or unsupervised, and may implement any suitable combination of online and offline learning.

In some examples, machine learning algorithm(s) 420 and/or trained machine learning model(s) 432 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 420 and/or trained machine learning model(s) 432. In some examples, trained machine learning model(s) 432 can be trained, reside, and execute to provide inferences on a particular UAV or other computing device, and/or otherwise can make inferences for the particular UAV or other computing device.

During training phase 402, machine learning algorithm(s) 420 can be trained by providing at least training data 410 as training input using unsupervised, supervised, semi-supervised, and/or reinforcement learning techniques. Unsupervised learning involves providing a portion (or all) of training data 410 to machine learning algorithm(s) 420 and machine learning algorithm(s) 420 determining one or more output inferences based on the provided portion (or all) of training data 410. Supervised learning involves providing a portion of training data 410 to machine learning algorithm(s) 420, with machine learning algorithm(s) 420 determining one or more output inferences based on the provided portion of training data 410, and the output inference(s) are either accepted or corrected based on correct results associated with training data 410. In some examples, supervised learning of machine learning algorithm(s) 420 can be governed by a set of rules and/or a set of labels for the training input, and the set of rules and/or set of labels may be used to correct inferences of machine learning algorithm(s) 420. Supervised learning of machine learning algorithm(s) 420 may include training data 410 provided by human operators and/or a trusted dataset, which may in some examples be provided by a third party.

Semi-supervised learning involves having correct results for part, but not all, of training data 410. During semi-supervised learning, supervised learning is used for a portion of training data 410 having correct results, and unsupervised learning is used for a portion of training data 410 not having correct results. Reinforcement learning involves machine learning algorithm(s) 420 receiving a reward signal regarding a prior inference, where the reward signal can be a numerical value. During reinforcement learning, machine learning algorithm(s) 420 can output an inference and receive a reward signal in response, where machine learning algorithm(s) 420 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 420 and/or trained machine learning model(s) 432 can be trained using other machine learning techniques, including but not limited to, incremental learning and curriculum learning.

In some examples, machine learning algorithm(s) 420 and/or trained machine learning model(s) 432 can use transfer learning techniques. For example, transfer learning techniques can involve trained machine learning model(s) 432 being pre-trained on one set of data and additionally trained using training data 410. More particularly, machine learning algorithm(s) 420 can be pre-trained on data from one or more computing devices and a resulting trained machine learning model provided to a UAV, where the UAV is intended to execute the trained machine learning model during inference phase 404. Then, during training phase 402, the pre-trained machine learning model can be additionally trained using training data 410, where training data 410 can be derived from the UAV. This further training of the machine learning algorithm(s) 420 and/or the pre-trained machine learning model using training data 410 of the UAV's own data can be performed using either supervised or unsupervised learning. Once machine learning algorithm(s) 420 and/or the pre-trained machine learning model has been trained on at least training data 410, training phase 402 can be completed. The trained resulting machine learning model can be utilized as at least one of trained machine learning model(s) 432.

In particular, once training phase 402 has been completed, trained machine learning model(s) 432 can be provided to a UAV, if not already on the UAV. Inference phase 404 can begin after trained machine learning model(s) 432 are provided to the UAV.

During inference phase 404, trained machine learning model(s) 432 can receive input data 430 and generate and output one or more corresponding inferences and/or predictions 450 about input data 430. As such, input data 430 can be used as an input to trained machine learning model(s) 432 for providing corresponding inference(s) and/or prediction(s) 450 to a UAV. For example, trained machine learning model(s) 432 can generate inference(s) and/or prediction(s) 450 in response to one or more inference/prediction requests 440. Input data 430 can include data from a first UAV executing trained machine learning model(s) 432 and/or input data from one or more other UAVs.

In some examples, input data 430 can include a collection of images provided by one or more sources. The collection of images can include still images, video frames, images resident on a UAV, and/or other images. In some examples, input data 430 may include one or more two-dimensional (2D) images captured by a ground-facing camera on a UAV and representative of an environment of the UAV. The images of the environment may include, among other possibilities, a terrain beneath the UAV when the UAV is navigating from a starting location to a target location. The images of the environment may also include a delivery zone to which the UAV is tasked with delivering a payload. Other types of input data are possible as well.

Inference(s) and/or prediction(s) 450 can include output images, output intermediate images, numerical values, and/or other output data produced by trained machine learning model(s) 432 operating on input data 430 (and training data 410). In some examples, trained machine learning model(s) 432 can use output inference(s) and/or prediction(s) 450 as input feedback 460. Trained machine learning model(s) 432 can also rely on past inferences as inputs for generating new inferences.

In some examples, an output image included within inference(s) and/or prediction(s) 450 may be a semantic segmentation image, also referred to herein as a semantic image or a segmentation image. The semantic segmentation image may include semantic labels, which may also be referred to herein as semantic classifications. The semantic labels may be selected from a predetermined set of labels. In some examples, the set of labels may include labels representing buildings, roads, vegetation, vehicles, driveways, lawns, and sidewalks. In further examples, other labels may be included within a set of semantic labels as well or instead.

In further examples, an output image included within inference(s) and/or prediction(s) 450 may be a depth image. Each pixel of the depth image may represent depth, or distance of the pixel to an imaging device which captured the image. In examples where the camera is a 2D camera, the depth image generated by a machine learning model may be referred to as a monocular depth image.

Output images included within inference(s) and/or prediction(s) 450 may be used by a UAV to facilitate UAV localization, navigation, payload delivery, and/or other deployment operations. In further examples, inference(s) and/or prediction(s) 450 may include other types of output data, which may be used to facilitate the same or different UAV deployment operations as well or instead.

VI. SELECTION OF DELIVERY ZONES

Figure 5:
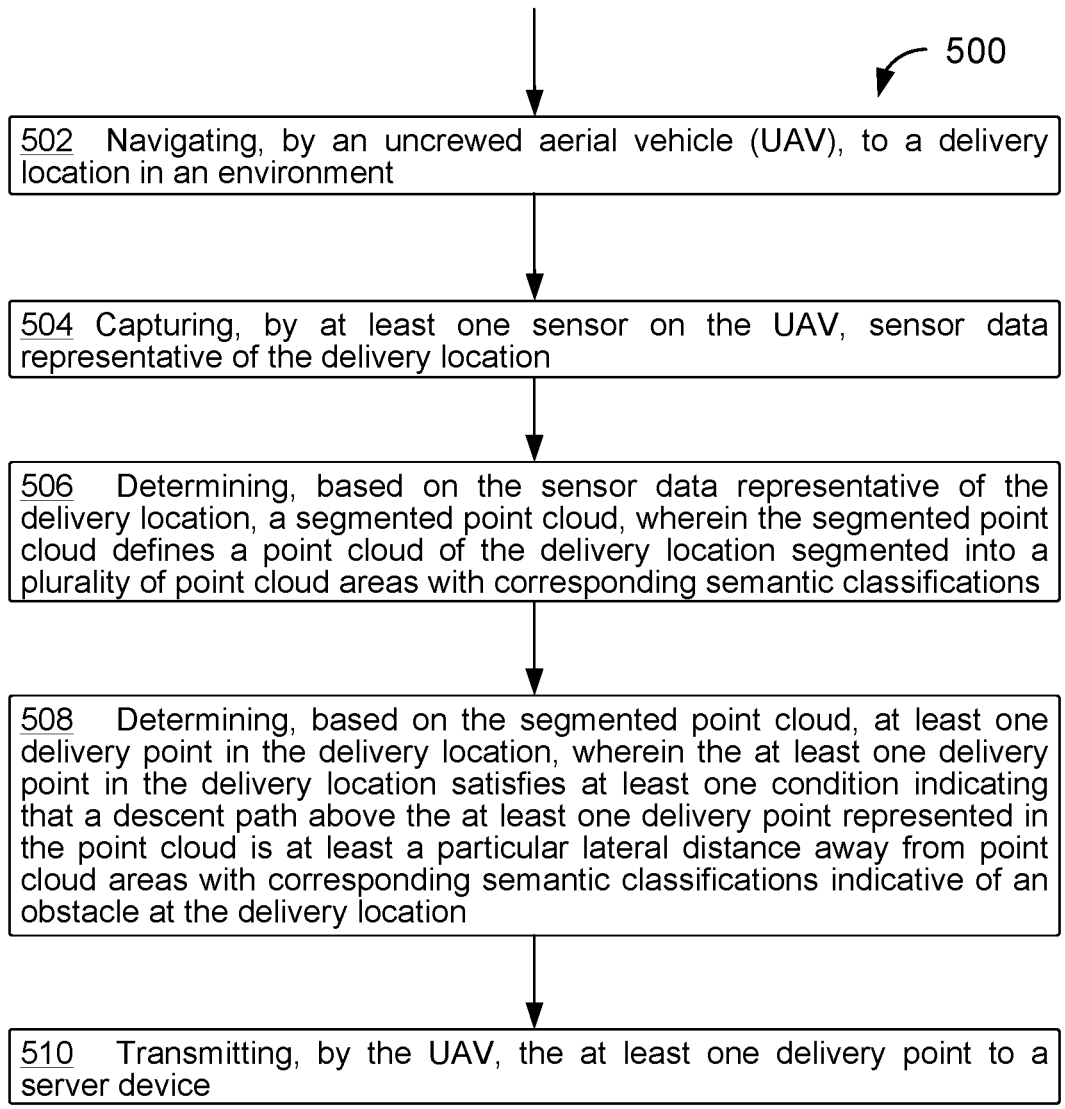
FIG. 5 is a block diagram of a method, in accordance with example embodiments.

FIG. 5 is a block diagram of a method, in accordance with example embodiments. Blocks 502, 504, 506, 508, and 510 may collectively be referred to as method 500. In some examples, method 500 may be carried out by a control system. In further examples, method 500 may be carried out by one or more processors, executing program instructions stored in a data storage. Execution of method 500 may involve a UAV, such as the UAV illustrated and described with respect to FIGS. 1-2. Other UAVs may also be used in the performance of method 500. In further examples, some or all of the blocks of method 500 may be performed by a control system remote from the UAV. In yet further examples, different blocks of method 500 may be performed by different control systems, located on and/or remote from a UAV.

Those skilled in the art will understand that the block diagram of FIG. 5 illustrates functionality and operation of certain implementations of the present disclosure. In this regard, each block of the block diagram may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 502, method 500 includes navigating, by an uncrewed aerial vehicle (UAV), to a delivery location in an environment. The delivery location may be an area in an environment to which the UAV may be tasked to deliver a payload. The UAV may determine the delivery location perhaps based on a map of the environment. Additionally and/or alternatively, the UAV may determine the delivery location based on a database of delivery locations to which the UAV may be tasked to deliver a payload. The UAV may navigate to the delivery location in the environment to survey the delivery location, perhaps to determine a delivery point at which the UAV may descend and deliver a payload. The UAV may store the delivery point in a database of delivery points, and the UAV may reference this database when determining where to deliver a payload.

At block 504, method 500 includes capturing, by at least one sensor on the UAV, sensor data representative of the delivery location. Sensor data of the delivery location may include one or more images from a camera on the UAV. Additionally and/or alternatively, sensor data of the delivery location may include other data captured by other sensors on the UAV, including, for example, data collected by a LIDAR sensor. In some examples, the UAV may capture the sensor data while the UAV is descending, perhaps in a periodic manner (e.g., every half second, every minute, and/or every few minutes). The UAV may also include other sensors and/or sensor systems to determine sensor data as well or instead, including, for example, time of flight camera systems.

Figure 6:
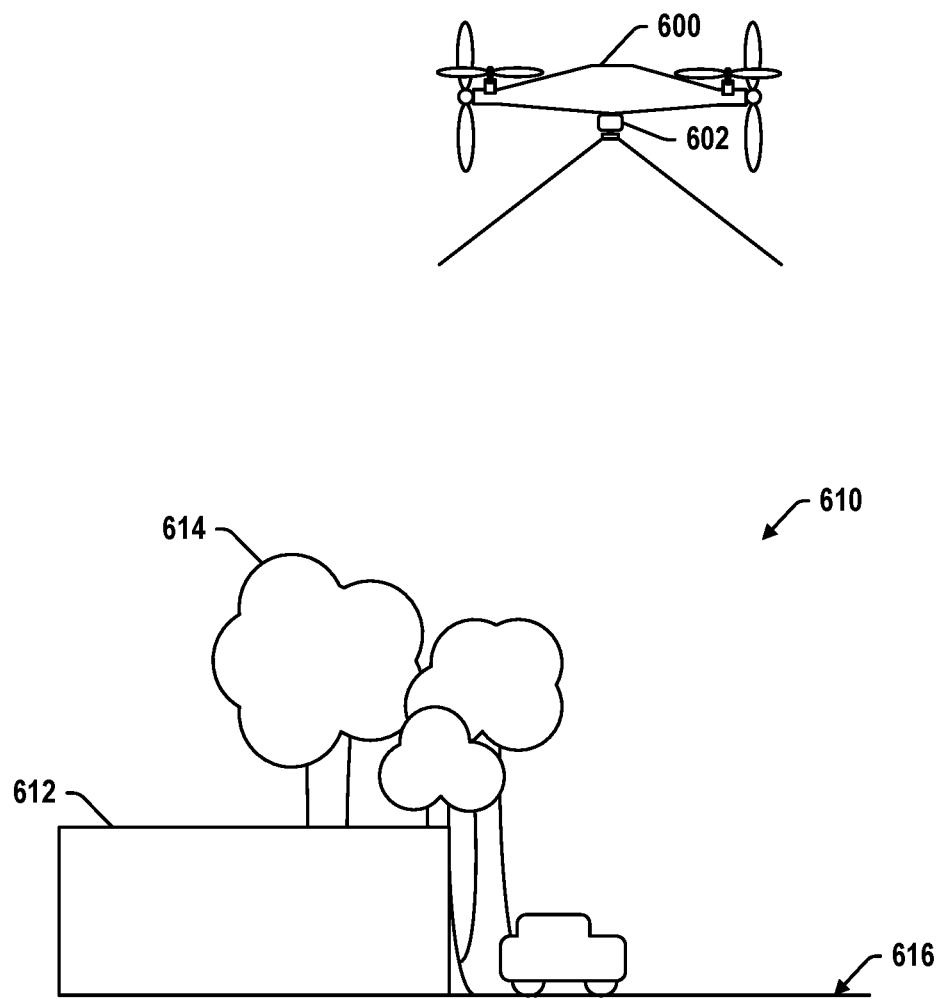
FIG. 6 illustrates a UAV capturing an image of a delivery location, in accordance with example embodiments.

FIG. 6 illustrates a UAV 600 capturing an image of a delivery location 610, in accordance with example embodiments. UAV 600 may have a configuration similar to example UAVs discussed above, e.g., UAV 100. In some examples, UAV 600 may include sensor 602, which may be a camera (e.g., a RGB camera) that faces downward. UAV 600 may control sensor 602 to take images of the environment to determine where to navigate to avoid obstacles, among other uses. These images may be representative of the location below the UAV.

Further, UAV 600 may include other sensor arrangements, e.g., depth sensor arrangements. In some examples, these depth sensor arrangements could include two or more cameras that work in conjunction to facilitate depth perception. Depth sensor arrangements could also include a single depth sensor, e.g., a LIDAR sensor. These sensor arrangements could help provide further information about the delivery location, including heights of obstacles to be avoided, among other information.

In the example depicted by FIG. 6, delivery location 610 includes building 612, trees 614, and grass lawn 616, among other elements. Some of the elements of delivery location 610, e.g., building 612 and trees 614 may be obstacles that may need to be avoided while delivering a payload, whereas other elements of delivery location 610, e.g., grass lawn 616 may be reasonable locations to deliver a payload.

Referring back to FIG. 5, at block 506, method 500 includes determining, based on the sensor data representative of the delivery location, a segmented point cloud. The segmented point cloud may define a point cloud of the delivery location segmented into a plurality of point cloud areas with corresponding semantic classifications. In some examples, the sensor data may include two-dimensional sensor data, whereas the segmented point cloud may be a three-dimensional point cloud representing the delivery location. The point cloud may be segmented into various point cloud areas, each point cloud area with a corresponding semantic classification.

Figure 7:
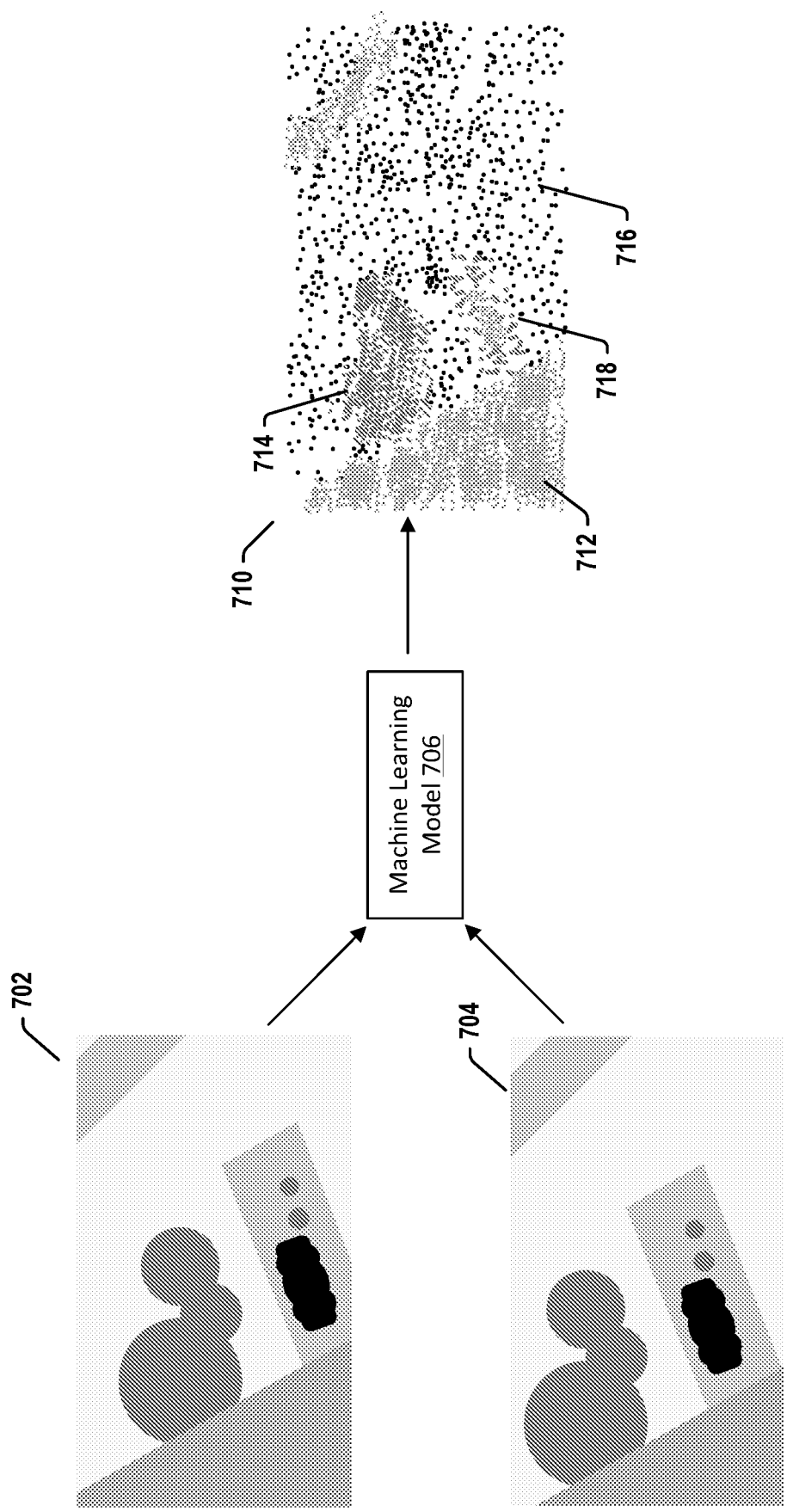
FIG. 7 illustrates images and a segmented point cloud, in accordance with example embodiments.

FIG. 7 illustrates images 702 and 704 and segmented point cloud 710, in accordance with example embodiments. Images 702 and 704 may be captured by a computing device as described above. Each of images 702 and 704 may be captured at a different location at the delivery location. In some examples, the UAV may capture image 704 after having moved from a point at the delivery location to another point at the delivery location. The UAV may also have captured image 704 after having descended a particular distance over a point at the delivery location. The UAV may also determine additional and/or other information to determine segmented point cloud 710, including, for example, LIDAR data. In some examples, when the UAV uses a camera to capture images of the delivery location, the UAV may capture two or more images of the delivery location to determine a segmented point cloud. The UAV may be able to determine a point cloud with greater accuracy if a greater amount of images of the delivery location. As mentioned above, other sensor data may also be collected. In some examples, the UAV may use one or more images from the camera and sensor data from a LIDAR sensor to determine the point cloud.

As illustrated by FIG. 7, the UAV may determine segmented point cloud 710 by inputting images 702 and 704 into machine learning model 706 to determine segmented point cloud 710. In addition to images 702 and 704, the UAV may determine additional images to input into machine learning model 706 to determine segmented point cloud 710. Additional images may result in a more accurate segmented point cloud. One or more images inputted into segmented point cloud 710 may be of a different point over the delivery location and/or one or more altitudes over a delivery point at the delivery location.

In some examples, the UAV may transmit images, including images 702 and 704, to a server device for input into a machine learning model, e.g., machine learning model 706, or otherwise to determine segmented point cloud 710. Transferring the images to a server device may help facilitate the processing of the sensor data into a segmented point cloud, particularly if the UAV collected a large quantity of images and/or sensor data. In turn, the UAV may receive the segmented point cloud from the server to determine one or more delivery points. Additionally and/or alternatively, the server device may determine the delivery points.

The segmented point cloud may define a point cloud of the delivery location segmented into a plurality of point cloud areas with corresponding semantic classifications. For example, segmented point cloud 710 may include point cloud area 714 representing trees 614, point cloud area 718 representing car 618, point cloud area 712 representing building 612, a point cloud area 716 representing grass lawn 616. These semantic classifications may correspond to whether the respective locations may serve as delivery points. For example, the area represented by point cloud area 714 representing trees 614 may not include any valid delivery points. However, grass lawn cloud area 716 representing grass lawn 616 may include one or more delivery points.

Referring back to FIG. 5, at block 508, method 500 includes determining, based on the segmented point cloud, at least one delivery point in the delivery location. The at least one delivery point in the delivery location satisfies at least one condition indicating that a descent path above the at least one delivery point represented in the point cloud is at least a particular lateral distance away from point cloud areas with corresponding semantic classifications indicative of an obstacle at the delivery location. Semantic classifications that indicate an obstacle may include those that correspond to an unacceptable delivery surface and those corresponding to an object exceeding a threshold height. For example, pixel areas with semantic classifications indicating a pool, a river, and a road, among others may all correspond to unacceptable delivery surfaces. In addition, objects with heights above a threshold height that a user can reach to obtain the payload (e.g., 3 feet) may also be considered indicative of an obstacle. Examples may include buildings, sheds, and/or houses.

Figure 8:
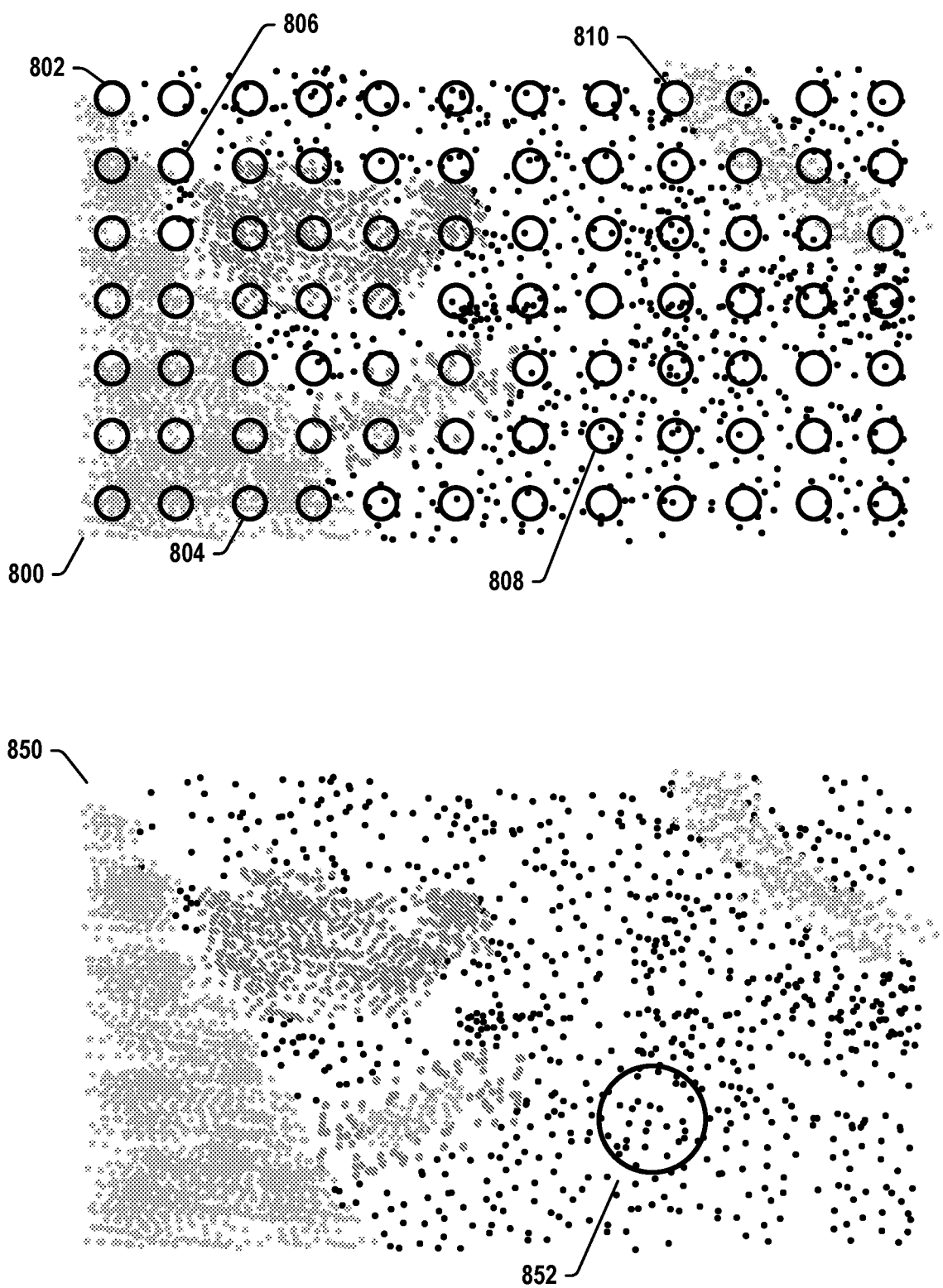
FIG. 8 illustrates sampling of segmented point clouds, in accordance with example embodiments.

FIG. 8 illustrates segmented point clouds 800 and 850, in accordance with example embodiments. Segmented point cloud 800 includes potential delivery point grid 802, which includes potential delivery points 804, 806, 808, and 810, among other delivery points indicated in FIG. 8. At each of the potential delivery points in potential delivery point grid 802, the UAV may receive sensor data and determine segmented point clouds for that delivery point. Additionally and/or alternatively, the UAV may combine the sensor data from each of the potential delivery points in potential delivery point grid 802 to determine a segmented point cloud (e.g., segmented point cloud 800). Each of the potential delivery points in potential delivery point grid 802 may be evenly spaced from each other in a grid pattern.

To determine sensor data for each of the potential delivery points indicated by potential delivery point grid 802, the UAV may navigate the environment in a lawnmower pattern. For example, the UAV may determine sensor data from an entire row of potential delivery points in potential delivery point grid 802 before moving to traverse the next, subsequent row in reverse order (e.g., the UAV may traverse the first row from left to right and move onto traversing the next row from right to left). Additionally and/or alternatively, the UAV may collect sensor data from an entire column of potential delivery points in potential delivery point grid 802 before moving onto the next, subsequent column. Further additionally and/or alternatively, the UAV may descend over a potential delivery point of potential delivery point grid 802, perhaps after having evaluated an entire row/column of potential delivery point grid 802. In particular, the UAV may descend a particular distance over each delivery point. For example, the UAV may determine additional sensor data every 50 feet.

Based on the data collected at each of the potential delivery points in potential delivery grid 802 and the determined segmented point cloud(s), the UAV may determine a delivery point according to one or more conditions, each condition indicating that a descent path above the at least one delivery point represented in the point cloud is at least a particular lateral distance away from point cloud areas with corresponding semantic classifications indicative of an obstacle at the delivery location.

Because segmented point cloud 800 is a three-dimensional representation of the environment, the UAV may consider whether a delivery point is at least a particular lateral distance away from obstacles from a particular altitude in the environment to a lower altitude in the environment. For example, the UAV may consider potential delivery point 804. The UAV may determine that the pixel area under potential delivery point 804 is a building, which may be considered an obstacle, thereby not meeting the condition that the delivery point be at least a particular lateral distance away from point cloud areas with corresponding semantic classifications indicative of an obstacle. The UAV may also consider potential delivery point 806, which the UAV may determine to also not be a valid delivery point, since potential delivery point may not meet the at least one condition by being too close to pixel areas with corresponding semantic classifications of building and tree. In contrast, the UAV may consider potential delivery points 808 and 810, which the UAV may determine to be valid delivery points for meeting the condition of being at least a threshold distance away from the pixel areas with semantic classifications corresponding to obstacles. As shown in segmented point cloud 850, which may be an example of and/or included in segmented point cloud 800, a valid delivery point may be delivery point 852. The descent path above delivery point 952 as represented in the point cloud may be at least a particular distance from point cloud areas indicative of obstacles. Delivery point 852 as depicted in segmented point cloud 850 may include the delivery point and an area within the particular distance of the delivery point (e.g., such that the particular distance is the radius of the delivery point).

Figure 9:
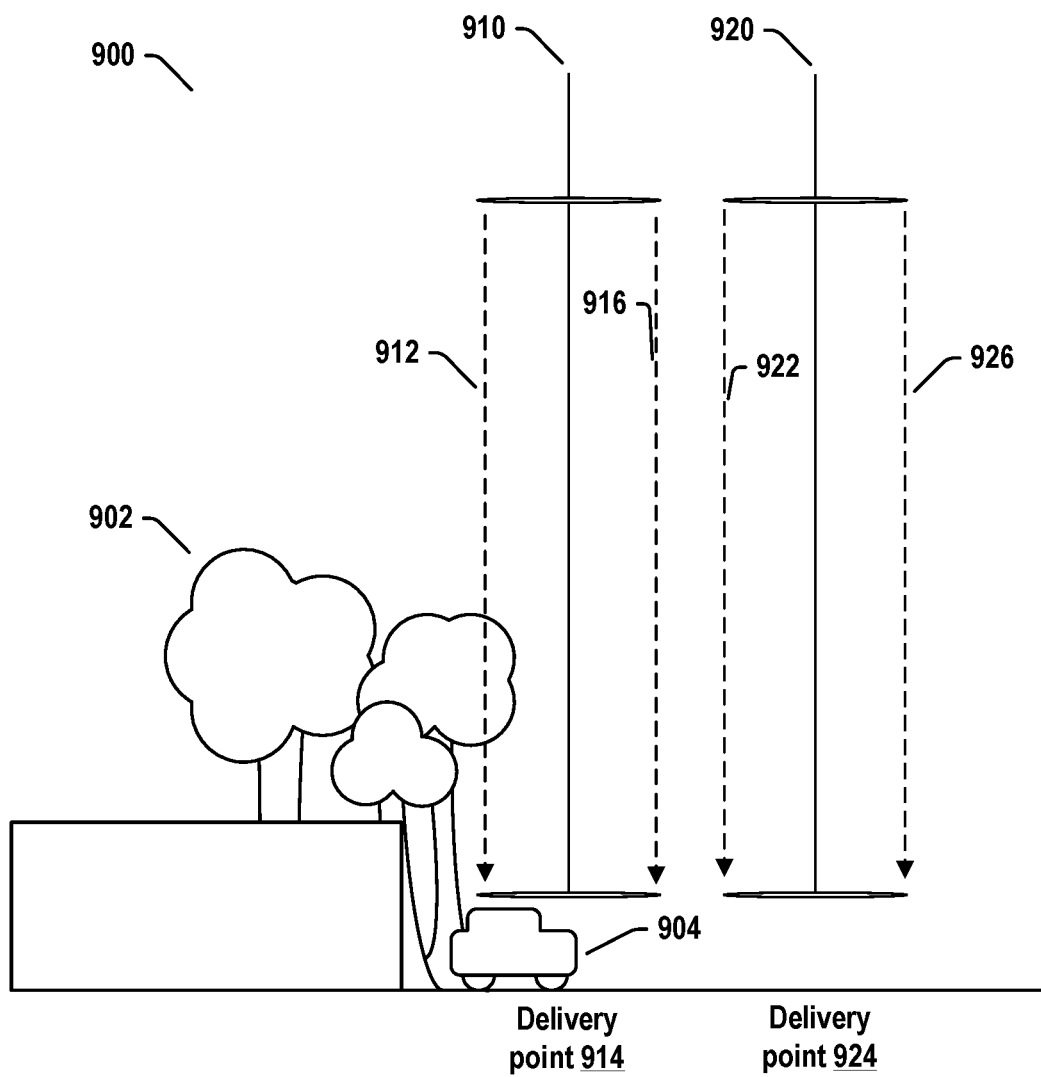
FIG. 9 illustrates delivery points, in accordance with example embodiments.

In another perspective, FIG. 9 illustrates delivery points 914 and 924 in environment 900 in accordance with example embodiments. Environment 900 may include trees 902 and vehicle 904. When evaluating delivery points, the UAV may apply a condition that indicates that the delivery point should be at least a particular lateral distance away from obstacles in the environment, including, for example, trees 902 and vehicle 904.

Because the UAV may descend and/or lower the payload for delivery, the condition of the delivery point being at least a particular lateral distance away from obstacles may be evaluated at each point along a descent path extending above the delivery point for a particular altitude. In other words, the delivery point may be evaluated as a cylinder centered around the delivery point with a radius of the particular lateral distance. For example, the UAV may evaluate delivery point 914 based on each point in descent path 910 being at least a particular lateral distance away from obstacles, the particular lateral distance being indicated by lines 912 and 916. As illustrated in FIG. 9, delivery point 914 may be above a vehicle, which may be an obstacle as a vehicle may not be a valid delivery surface. In addition, delivery point 914 may also not meet the condition that the delivery point be at least a particular lateral distance away from obstacles, as trees 902 are less than the particular lateral distance away from delivery point 914, as indicated by lines 912 and 916.

In contrast, delivery point 924 may be a valid delivery point as delivery point 924 meets the conditions that the delivery point be at least a particular distance away from obstacles. Delivery point 924 may be evaluated at each point along descent path 920 for being at least a particular distance away from obstacles as indicated by lines 922 and 926. In other words and as mentioned above, delivery point 924 may be evaluated based on a cylinder centered above delivery point 924 with a radius of the particular lateral distance, and obstacles that intersect the cylinder may cause delivery point 924 to be invalid. However, as illustrated in FIG. 9, delivery point 924 may not have any obstacles that intersect the cylinder, thereby meeting the condition that the valid delivery point be at least a particular lateral distance away from obstacles. Thus, delivery point 924 may be a valid delivery point.

The predetermined altitude from which the delivery path is evaluated may be based on where the UAV captured the sensor data. For example, the UAV may capture the images for the segmented point cloud at approximately 100 feet in the air. The UAV may thus evaluate the delivery point from the ground to 100 feet in the air. Additionally and/or alternatively, the UAV may capture the images for the segmented point cloud at a range of altitudes (e.g., 50 feet to 100 feet above ground level), and the UAV may evaluate the delivery point from the ground until an altitude within the range of altitudes (e.g., 50 feet above ground level). Further additionally and/or alternatively, the UAV may capture images in a suburban area with low buildings and tall trees, and the UAV may evaluate the delivery point from the ground until 100 feet above the ground to take into account all the potential trees. In contrast, if the UAV captures images in an urban area with tall buildings, the UAV may evaluate the delivery point from the ground until 1000 feet above the ground to take into account all the potential buildings.

In some examples, determining the delivery point may be based on the delivery point meeting one or more conditions, each condition associated with a different semantic classification. For example, the conditions may include a condition that indicates if the pixel area is associated with a semantic classification of being a building, then the delivery point should be at least ten feet away or at least another lateral distance away from the building. The conditions may also include a condition that indicates if the pixel area is associated with a semantic classification of being a tree, then the delivery point should be at least eight feet away or other lateral distance away from the building.

One or more of the conditions may correspond to a single semantic classification. For example, the conditions may include different thresholds for buildings of different heights. A condition may be that a delivery point should be at least 30 feet away from point cloud areas with a semantic classification of a building and the point cloud area is associated with an area in the environment that is predicted to be at or above 1200 feet tall. Another condition may be that a delivery point should be at least 20 feet away from a point cloud area with a semantic classification of a building and the point cloud area is associated with an area in the environment that is predicted to be between 600 feet tall and 1200 feet tall. Additionally and/or alternatively, another condition may be that a delivery point should be at least 10 feet away from a point cloud area with a semantic classification of a building and the point cloud area is associated with an area in the environment that is predicted to be at or below 600 feet tall.

Determining delivery points that meet these conditions may help negate potential inaccuracies in the sensor data. In particular, determining delivery points with conditions of varying lateral distance requirements based on the height of the obstacle may help negate inaccuracies due to the multipath effect, where signals may be scattered by objects in the environment, causing scattering and/or reflection of the signal, resulting in inaccuracies with the detected signal. Further, determining delivery points with conditions of varying lateral distance requirements based on the type of the obstacle may help the UAV avoid accidents with objects where the boundaries of the object are uncertain to the UAV.

Referring back to FIG. 5, at block 510, method 500 includes transmitting, by the UAV, the at least one delivery point to a server device. The UAV may determine one or more valid delivery points, each delivery point meeting all the conditions of a valid delivery point. In such instances, the UAV may transmit all the delivery points to the UAV or a subset of the determined delivery points that best meet the conditions.

In some examples, the UAV may store the valid delivery points in a storage device connected to the UAV rather than or in addition to sending the valid delivery points to a server device. When tasked with a mission at a particular delivery location, the UAV may request and receive delivery points at the particular location from the storage device, and the UAV may use the received delivery points to help deliver the payload. In some examples, if the UAV requests delivery points from the storage device for the particular delivery location and receives an indication that the UAV does not store delivery points for the delivery location, the UAV may then request delivery points from a server device. Further, in some examples, the UAV may send the delivery points to one or more additional UAVs in a fleet of UAVs, such that each UAV in the fleet of UAVs store delivery points determined by the fleet of UAVs. Having a fleet of UAVs that each store the delivery points determined by the fleet of UAVs may be useful if each fleet of UAVs is assigned to a particular group of delivery locations.

In some examples, the server device may receive and store determined delivery points for one or more delivery locations as determined by a fleet of UAVs. When a particular UAV is tasked with a mission to deliver a payload to a particular delivery location, the UAV may retrieve the delivery points aggregated from the fleet of UAVs, and the UAV may determine the delivery point to use based on these delivery points.

When the UAV receives a plurality of delivery points that may be valid, the UAV may apply one or more additional conditions to determine which delivery point to deliver to. In particular, the one or more additional conditions may be based on which delivery point is least likely to have undetected obstacles. For example, the UAV may choose a delivery point that is in the backyard of a home rather than the front yard of a home, because the backyards of homes may be less likely to have powerlines. Additionally and/or alternatively, the UAV may select a delivery point from a plurality of delivery points randomly, particularly when the delivery points have roughly the same properties (e.g., are all in a backyard and are roughly equivalent distances from obstacles).

When the UAV is tasked with a mission to deliver a payload to a particular location, the UAV may request and receive one or more valid delivery points at the particular location from the server device. The UAV may navigate to the delivery location and evaluate whether the delivery point is still a valid delivery point. In particular, the UAV may capture additional images and/or sensor data of the delivery location. The UAV may carry out substantially the same operations as described above to determine whether the delivery location is still a valid delivery point, including determining a point cloud of the delivery location and determining whether the delivery point meets the conditions based on the point cloud of the delivery location. If the delivery point is still a valid delivery point, the UAV may continue the delivery process to deliver the payload, perhaps by descending to be a particular altitude above the delivery point and lowering the payload. If the delivery point is no longer a valid delivery point, the UAV may evaluate another delivery point, perhaps by transmitting a request to the server device for another potential delivery point and evaluating the potential delivery point.

Predetermining delivery points may allow the UAV to focus on other areas of navigation rather than determining a valid delivery point when delivering a payload. In particular, the UAV and/or server device may predetermine a flight trajectory based on the delivery point prior to the UAV delivering the payload. If the server device determines the flight trajectory, the UAV may retrieve and follow the flight trajectory to the delivery point. The UAV may determine one or more obstacles along the flight trajectory and navigate to avoid these obstacles, rather than attempting to determine an optimal flight trajectory during the flight, such that the flight trajectory avoids obstacles and allows the UAV to arrive at the delivery location.

In some examples, the at least one condition comprises a plurality of conditions, each of which is associated with a different semantic classification.

In some examples, each of the plurality of conditions is further associated with a different particular lateral distance away from point cloud areas with a respective semantic classification.

In some examples, determining, based on the segmented point cloud, the at least one delivery point in the delivery location comprises selecting a delivery point from a plurality of candidate delivery points evenly spaced in a grid pattern in the environment.

In some examples, the at least one delivery point in the delivery location satisfies an additional condition indicating that the descent path above the at least one delivery point represented in the point cloud is at least an additional particular lateral distance away from point cloud areas with corresponding semantic classifications indicative of an obstacle at the delivery location. The additional particular lateral distance is greater than the particular lateral distance and enables landing of the UAV at the delivery location.

In some examples, the at least one condition comprises a condition indicating that the descent path above the at least one delivery point represented in the point cloud is at least a particular lateral distance away from point cloud areas with corresponding semantic classifications indicative of a building at the delivery location.

In some examples, the at least one condition comprises a first condition and a second condition. The first condition indicates that the descent path is at least a first lateral distance away from point cloud areas with corresponding semantic classifications indicative of a building of a first height. The second condition indicates that the descent path is at least a second lateral distance away from point cloud areas with corresponding semantic classifications indicative of a building of a second height. The first height is greater than the second height and the first lateral distance is greater than the second lateral distance.

In some examples, the descent path is from a ground surface at the at least one delivery point to a predetermined altitude above the at least one delivery point, where the predetermined altitude is associated with where the UAV captured the sensor data.

In some examples, the sensor data comprises two-dimensional representations of the delivery location, where the point cloud is a three-dimensional representation of the delivery location.

In some examples, determining, based on the sensor data of the delivery location, a segmented point cloud is based on applying at least one pre-trained machine learning model to the sensor data of the delivery location.

In some examples, method 500 further comprises selecting a delivery point from the at least one delivery point based on determining that the delivery point is at a particular location relative to a building.

In some examples, method 500 further comprises transmitting a request to the server device for a delivery point at the delivery location and receiving, from the server device, a response comprising the delivery point.

In some examples, method 500 further comprises capturing, by the UAV, one or more additional images of the delivery location and verifying, based on the one or more additional images of the delivery location, whether a selected delivery point of the at least one delivery point satisfies the at least one condition. Method 500 may further comprise based on verifying that the selected delivery point does satisfy the at least one condition, descending to be a particular altitude above the selected delivery point.

In some examples, method 500 further comprises transmitting a request to the server device for a flight trajectory to the at least one delivery point at the delivery location. Method 500 may also include receiving, from the server device, a response comprising the flight trajectory to the at least one delivery point and include navigating, by the UAV, along the flight trajectory to the delivery point. Method 500 may also include, while navigating along the flight trajectory to the delivery point, determining one or more obstacles along the flight trajectory and navigating to avoid the one or more obstacles in the flight trajectory.

In some examples, determining, based on the segmented point cloud, at least one delivery point in the delivery location comprises selecting the at least one delivery point to be on a surface represented in the point cloud with a corresponding semantic classification to which delivery is permitted.

In some examples, capturing, by the sensor on the UAV, the sensor data of the delivery location comprises navigating the UAV to a plurality of locations at the delivery location and capturing an image at each of the plurality of locations.

In some examples, navigating the UAV to a plurality of locations at the delivery location comprises navigating in a lawnmower pattern.

In some examples, capturing, by the sensor on the UAV, sensor data of the delivery location comprises capturing one or more images of the delivery location while descending over the delivery location.

In some examples, the sensor on the UAV is a camera or a LIDAR sensor.

In some examples, the semantic classifications indicative of an obstacle comprise semantic classifications corresponding to an unacceptable delivery surface and semantic classifications corresponding to an object exceeding a threshold height.

In some examples, a UAV includes a sensor and a control system, where the control system is configured to carry out the operations of method 500.

In some examples, a non-transitory computer readable medium comprising program instructions executable by one or more processors to perform the operations of method 500.

In some examples, the operations described above may be performed by one or more computing devices.

VII. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above-detailed description describes various features and functions of the disclosed systems, devices, and methods with reference to the accompanying figures. In the figures, similar symbols typically identify similar components unless context dictates otherwise. The example embodiments described herein and in the figures are not meant to be limiting. Other embodiments can be utilized, and other changes can be made without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code or data for longer periods of time, such as secondary or persistent long-term storage, like read-only memory (ROM), optical or magnetic disks, compact-disc read-only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
navigating, by an uncrewed aerial vehicle (UAV), to a delivery location in an environment;
capturing, by at least one sensor on the UAV, sensor data representative of the delivery location;
determining, based on the sensor data representative of the delivery location, a segmented point cloud, wherein the segmented point cloud defines a point cloud of the delivery location segmented into a plurality of point cloud areas with corresponding semantic classifications;
determining, based on the segmented point cloud, at least one delivery point in the delivery location, wherein the at least one delivery point in the delivery location satisfies at least one condition, each condition indicating that a descent path through a cylinder centered above the at least one delivery point with a radius of a particular lateral distance does not intersect with point cloud areas with corresponding semantic classifications indicative of an obstacle at the delivery location; and
transmitting, by the UAV, the at least one delivery point to a server device.

2. The method of claim 1, wherein the at least one condition comprises a plurality of conditions, each of which is associated with a different semantic classification.

3. The method of claim 2, wherein each of the plurality of conditions is further associated with a different particular lateral distance away from point cloud areas with a respective semantic classification.

4. The method of claim 1, wherein determining, based on the segmented point cloud, the at least one delivery point in the delivery location comprises selecting a delivery point from a plurality of candidate delivery points evenly spaced in a grid pattern in the environment.

5. The method of claim 1, wherein the at least one delivery point in the delivery location satisfies an additional condition indicating that the descent path above the at least one delivery point represented in the point cloud is at least an additional particular lateral distance away from point cloud areas with corresponding semantic classifications indicative of an obstacle at the delivery location, wherein the additional particular lateral distance is greater than the particular lateral distance and enables landing of the UAV at the delivery location.

6. The method of claim 1, wherein the at least one condition comprises a condition indicating that the descent path above the at least one delivery point represented in the point cloud is at least a particular lateral distance away from point cloud areas with corresponding semantic classifications indicative of a building at the delivery location.

7. The method of claim 1, wherein the at least one condition comprises a first condition and a second condition, wherein the first condition indicates that the descent path is at least a first lateral distance away from point cloud areas with corresponding semantic classifications indicative of a building of a first height, wherein the second condition indicates that the descent path is at least a second lateral distance away from point cloud areas with corresponding semantic classifications indicative of a building of a second height, wherein the first height is greater than the second height and the first lateral distance is greater than the second lateral distance.

8. The method of claim 1, wherein the descent path is from a ground surface at the at least one delivery point to a predetermined altitude above the at least one delivery point, wherein the predetermined altitude is associated with where the UAV captured the sensor data.

9. The method of claim 1, wherein the sensor data comprises two-dimensional representations of the delivery location, wherein the point cloud is a three-dimensional representation of the delivery location.

10. The method of claim 1, wherein determining, based on the sensor data of the delivery location, a segmented point cloud is based on applying at least one pre-trained machine learning model to the sensor data of the delivery location.

11. The method of claim 1, further comprising:
selecting a delivery point from the at least one delivery point based on determining that the delivery point is at a particular location relative to a building.

12. The method of claim 1, wherein the method further comprises:
- transmitting a request to the server device for a delivery point at the delivery location; and
- receiving, from the server device, a response comprising the delivery point.

13. The method of claim 1, further comprising:
- capturing, by the UAV, one or more additional images of the delivery location;
- verifying, based on the one or more additional images of the delivery location, whether a selected delivery point of the at least one delivery point satisfies the at least one condition; and
- based on verifying that the selected delivery point does satisfy the at least one condition, descending to be a particular altitude above the selected delivery point.

14. The method of claim 1, wherein the method further comprises:
- transmitting a request to the server device for a flight trajectory to the at least one delivery point at the delivery location;
- receiving, from the server device, a response comprising the flight trajectory to the at least one delivery point;
- navigating, by the UAV, along the flight trajectory to the delivery point;
- while navigating along the flight trajectory to the delivery point, determining one or more obstacles along the flight trajectory; and
- navigating to avoid the one or more obstacles in the flight trajectory.

15. The method of claim 1, wherein determining, based on the segmented point cloud, at least one delivery point in the delivery location comprises selecting the at least one delivery point to be on a surface represented in the point cloud with a corresponding semantic classification to which delivery is permitted.

16. The method of claim 1, wherein capturing, by the at least one sensor on the UAV, the sensor data of the delivery location comprises:
- navigating the UAV to a plurality of locations at the delivery location; and
- capturing an image at each of the plurality of locations.

17. The method of claim 16, wherein navigating the UAV to a plurality of locations at the delivery location comprises navigating in a lawnmower pattern.

18. The method of claim 1, wherein the capturing, by the at least one sensor on the UAV, sensor data of the delivery location comprises capturing one or more images of the delivery location while descending over the delivery location.

19. The method of claim 1, wherein the sensor on the UAV is a camera or a LIDAR sensor.

20. The method of claim 1, wherein the semantic classifications indicative of an obstacle comprise semantic classifications corresponding to an unacceptable delivery surface and semantic classifications corresponding to an object exceeding a threshold height.

21. An uncrewed aerial vehicle (UAV), comprising:
- at least one sensor; and
- a control system configured to:
  - navigate, by the UAV, to a delivery location in an environment;
  - capture, by the at least one sensor on the UAV, sensor data representative of the delivery location;
  - determine, based on the sensor data representative of the delivery location, a segmented point cloud, wherein the segmented point cloud defines a point cloud of the delivery location segmented into a plurality of point cloud areas with corresponding semantic classifications;
  - determine, based on the segmented point cloud, at least one delivery point in the delivery location, wherein the at least one delivery point in the delivery location satisfies at least one condition, each condition indicating that a descent through a cylinder centered above the at least one delivery point with a radius of a particular lateral distance does not intersect with point cloud areas with corresponding semantic classifications indicative of an obstacle at the delivery location; and
  - transmit, by the UAV, the at least one delivery point to a server device.

22. A non-transitory computer readable medium comprising program instructions executable by one or more processors to perform operations, the operations comprising:
- navigating, by an uncrewed aerial vehicle (UAV), to a delivery location in an environment;
- capturing, by at least one sensor on the UAV, sensor data representative of the delivery location;
- determining, based on the sensor data representative of the delivery location, a segmented point cloud, wherein the segmented point cloud defines a point cloud of the delivery location segmented into a plurality of point cloud areas with corresponding semantic classifications;
- determining, based on the segmented point cloud, at least one delivery point in the delivery location, wherein the at least one delivery point in the delivery location satisfies at least one condition, each condition indicating that a descent path through a cylinder centered above the at least one delivery point with a radius of a particular lateral distance does not intersect with point cloud areas with corresponding semantic classifications indicative of an obstacle at the delivery location; and
- transmitting, by the UAV, the at least one delivery point to a server device.

* * * * *